United States Patent [19]

Huntzinger et al.

[11] 4,096,735
[45] Jun. 27, 1978

[54] ENGINE DETONATION SENSOR WITH DOUBLE SHIELDED CASE

[75] Inventors: Gerald O. Huntzinger; Charles E. Buck; Robert E. Campbell, all of Anderson, Ind.

[73] Assignee: General Motors Corporation, Detroit, Mich.

[21] Appl. No.: 829,778

[22] Filed: Sep. 1, 1977

Related U.S. Application Data

[63] Continuation-in-part of Ser. No. 767,995, Feb. 11, 1977, abandoned.

[51] Int. Cl.² .................. G01P 15/08; H01L 41/14
[52] U.S. Cl. ................................. 73/35; 310/26
[58] Field of Search .......................... 73/35; 310/26

[56] References Cited

U.S. PATENT DOCUMENTS

| | | | |
|---|---|---|---|
| 2,116,522 | 5/1938 | Kunze | 177/386 |
| 2,269,760 | 1/1942 | Eldredge | 73/35 X |
| 2,435,031 | 1/1948 | Burns et al. | 73/35 X |
| 2,826,706 | 3/1958 | Sackett | 310/26 |
| 2,846,563 | 8/1958 | Cronin | 219/86 |

Primary Examiner—James J. Gill
Attorney, Agent, or Firm—Robert M. Sigler

[57] ABSTRACT

A detonation sensor adapted for mounting on a vehicle engine component has a cylindrical outer case with an open end. An inner cylindrical case has an open end facing in the opposite direction as that of the outer case and is so disposed coaxially within the outer case that it is held slightly axially separated therefrom by at least one rod of a magnetostrictive material and a magnet axially in line therewith. The edges of the open end of the outer case are crimped over a washer which abuts the closed end of the inner case to exert an axial stress on the magnetostrictive rod. Axial mounting means are provided on the outer case; and a pickup coil surrounds the magnetostrictive rod within the inner case. Both inner and outer cases are formed from a magnetic material to shield the coil from external electromagnetic signals.

2 Claims, 3 Drawing Figures

ENGINE DETONATION SENSOR WITH DOUBLE SHIELDED CASE

BACKGROUND OF THE INVENTION

This is a continuation-in-part of application Ser. No. 767,995, filed Feb. 11, 1977, now abandoned.

This invention relates to magnetostrictive detonation or vibration sensors and especially to such sensors adapted for use on an automotive engine for sensing detonation or knock thereof. A sensor of this type would be useful in the knock limiting spark timing system shown in the U.S. Pat. No. 4,002,155 to Harned et al and would offer a great cost advantage in such a system, since a magnetostrictive sensor can be built for much less cost than the commercially available piezoelectric vibration sensors.

However, in the environment surrounding an automotive vehicle engine, there is a possibility of stray electromagnetic signals being present. Such signals, if sufficiently strong, might cause flux changes in the magnetostrictive element which could be picked up by the coil surrounding the magnetostrictive element and mistaken for indications of vehicle knock, causing unnecessary retard and consequent engine surge. Thus, it is useful to adequately shield the pickup coil of the sensor from such signals without greatly increasing the cost or complexity of the sensor itself.

SUMMARY OF THE INVENTION

This invention comprises a detonation sensor with inner and outer cylindrical cases, each having one open axial end and being made of a magnetic material. The inner case is turned axially opposite to the outer case and inserted axially therein; and the inner and outer cases exert a compressive stress on one or more axially oriented magnetostrictive rods and a magnet disposed therebetween. Means are provided at the open end of the outer case for crimping over a washer which abuts the closed end of the inner case to hold the inner case in place and the magnetostrictive rod in a predetermined preload stress. A pickup coil surrounds the magnetostrictive rods within the inner case, where it is isolated by the inner and outer cases from external electromagnetic radio frequency interference but is sensitive to the changing reluctance of the magnetostrictive rods due to axial vibration with consequent variation of the stress thereon. The double shielding of the inner and outer cases provides greater protection from stray electromagnetic signals than would a single case; but the double shielding is accomplished with simple, easily assembled and inexpensive apparatus.

Further details and advantages of this invention will be apparent from the accompanying drawings and following description of a preferred embodiment.

DESCRIPTION OF THE PREFERRED EMBODIMENT

Figure 1:
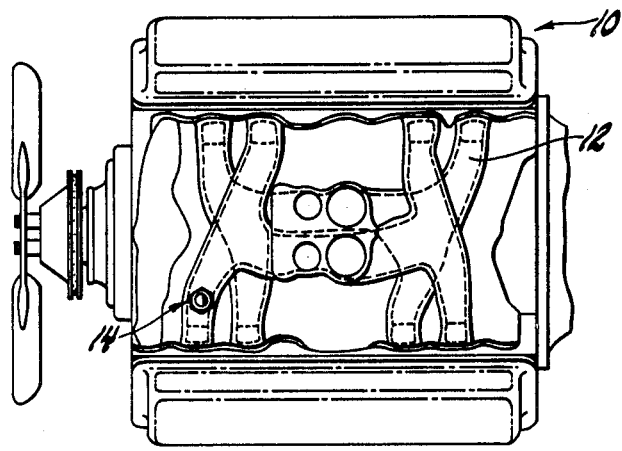
FIG. 1 shows this invention in its environment.

Referring to FIG. 1, an internal combustion engine 10 has a plurality of cylinders and an intake manifold 12 effective to deliver a fluid fuel component to said cylinders. Engine 10 is adapted to combine hydrocarbon or other fuel with oxygen within said cylinders and convert a portion of the energy reaction into mechanical force through the expansion of the gases therein against pistons which turn a crankshaft and thereby propel a vehicle. In a spark ignition engine, the reactions in each cylinder are initiated by the firing of a spark plug at a predetermined time to produce a smooth expansion of the gases against the pistons.

As is well known in the art, however, a number of factors such as low octane gasoline, too much spark advance or unfavorable environmental factors may cause an uneven expansion of the gases with resulting sharp vibrations in the engine structure known as knock or detonation. This knock or detonation, if loud enough, may be audible and annoying to vehicle occupants; and, in extreme cases, it might damage engine parts.

In the aforementioned Harned et al patent, a system is disclosed to sense the ringing vibrations of an engine component produced by knock, measure the severity of such vibrations and retard spark timing from the normal timing, when necessary, by an amount sufficient to maintain said knock at a borderline level. This system requires a vibration sensor suitable for mounting on an engine component and effective to produce an output electrical signal corresponding to the vibrations experienced thereby.

Magnetostrictive detonation sensor 14 is fixedly mounted on intake manifold 12, as seen in FIG. 1, to vibrate therewith. The particular location of sensor 14 shown is not important to this invention and may not even be the optimum location for the sensor; however, it is a location which has been found to be effective in at least one type of engine as described in the aforementioned Harned et al patent.

Figure 2:
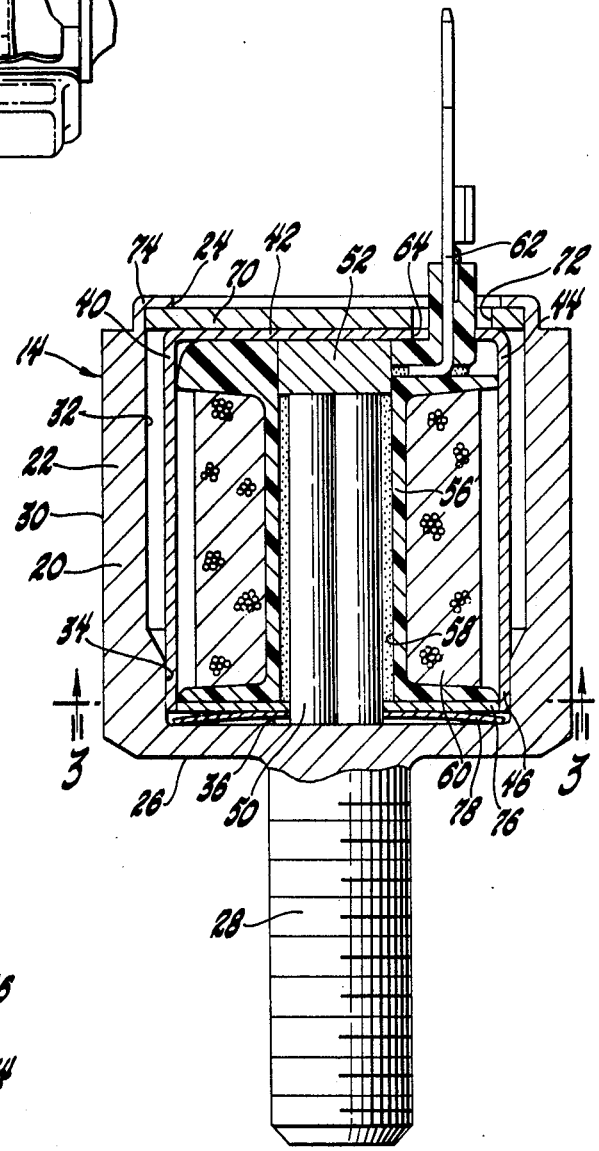
FIG. 2 is a side cutaway view of an embodiment of this invention for use in the environment of FIG. 1.
Figure 3:
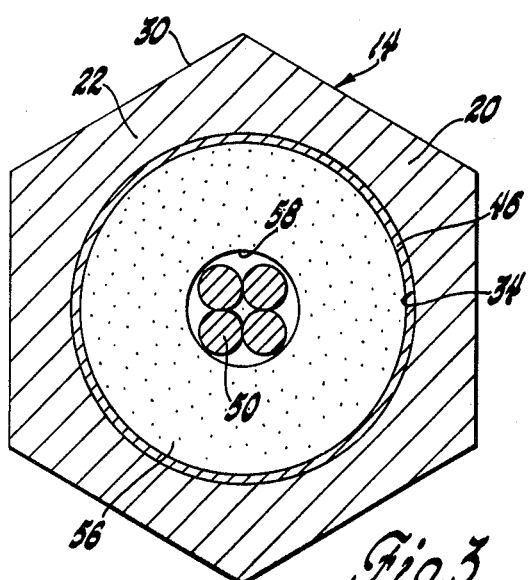
FIG. 3 is a section along lines 3—3 in FIG. 2.

The structure of sensor 14 is shown in more detail in FIGS. 2 and 3. Referring to FIG. 2, sensor 14 comprises an outer case 20 made of a magnetic material such as steel. Case 20 comprises a generally cylindrical portion 22 having an open axial end 24 and a closed axial end 26 with a threaded stud 28 extending axially therefrom. Threaded stud 28 is adapted for attachment to intake manifold 12 so that outer case 20 vibrates with that portion of intake manifold 12 on which it is mounted.

The outer surface 30 of cylindrical portion 22 is seen, in FIG. 3, to be hexagonal in cross section to fit a wrench used to turn threaded stud 28 into a matching threaded concavity in intake manifold 14; however, the inner surface 32 is cylindrical in shape with a step-down bore 34 of slightly reduced inner diameter adjacent the inner axial surface 36.

Within cylindrical portion 22 is disposed an inner case 40 made of a magnetic material such as steel. Inner case 40 is generally cylindrical in shape with a closed end 42, a cylindrical side wall 44 and an open axial end 46. Open axial end 46 is axially, slidably received within step-down bore 34 of outer case 20; and closed end 42 is disposed just within open end 24 of outer case 20.

A magnetostrictive element 50 and a permanent magnet 52, axially in line therewith, are disposed between the closed end 42 of inner case 40 and inner surface 36 of outer case 20. The magnetostrictive element 50, in this embodiment, comprises four rods made from a magnetostrictive material such as a 49% nickel and iron alloy, a material well known in the art. Since these magnetostrictive rods 50 are part of a magnetic flux path surrounded by a current carrying pickup coil, multiple rods are used to minimize eddy currents, which would be stronger in a single rod. The magnetostrictive rods 50 possess the property of changing their magnetic reluctance as the stress on them is changed. The magnet 52 is disc shaped from a material such as alnico 5 and is axially aligned with magnetostrictive element 50. The length of magnetostrictive element 50 and the axial thickness of permanent magnet 52 are such that together they are slightly longer than cylindrical side wall 44 of inner case 40 and thus prevent the open end 46 of inner case 40 from abutting surface 36 of outer case 20. Thus, most of any axial force tending to push inner case 40 inward toward inner surface 36 of outer case 20 is taken by magnet 52 and magnetostrictive element 50 to establish a compressive preload on magnetostrictive element 50. Alternate means for establishing the basic magnetic flux through magnetostrictive element 50 are also contemplated.

A spool 56 is disposed axially within inner case 40 with the magnet 52 and magnetostrictive element 50 disposed within the inner axial opening 58 thereof. A pickup coil 60 is wound on spool 56 within inner case 40 and communicates by means of terminal assembly 62 through an opening 64 in inner case 40 to external circuitry effective to amplify and process any signal voltages induced in the coil by the changes in magnetic flux in magnetostrictive element 50 due to engine vibrations.

A washer 70 is disposed outside and against closed axial end 42 of inner case 40, with an opening 72 therethrough to accommodate terminal assembly 62. Washer 70 can be made from steel and is pressed against closed axial end 42 by a crimped over flange 74 at the open axial end 24 of outer case 20. Thus flange 74 operatively engages inner case 40 to apply therethrough the preload stress to the magnetostrictive rods 50, so that their magnetic reluctance can be changed by vibration of the sensor 14 in the axial direction. Another washer 76 and spring 78 between spool 56 and inner axial surface 36 help hold the spool 56 and coil 60 still within inner case 40.

One or both of the inner 40 and outer 20 cases provide a closed flux path for flux from magnet 52 through magnetostrictive element 50. In addition, however, both cases provide a flux path for external electromagnetic flux to the engine 10 in parallel with magnetostrictive element 50 to reduce the amount of such external flux through magnetostrictive element 50. The inner case 40, by itself, would shunt some of the external flux from the magnetostrictive element, but the outer case 20 increases the proportion of flux so shunted, particularly if there is a substantial reluctance at the open end 46 of inner case 40.

It can be seen that the sensor of this invention is easy to assemble. The magnet 52, magnetostrictive rods 50 and spool 56 with pickup coil 60 and terminal assembly 62 can be assembled within inner case 40, with washer 76 and spring 78 added at the open end 46 thereof. The outer case 20 can then be placed over inner case 40, washer 70 placed against closed end 42, a measured preload exerted on washer 70 and flange 74 crimped over. The completed sensor has a double magnetic shield in cases 20 and 40 but contains no threaded fasteners and a minimum of machined parts or surfaces.

It has been found acceptable in tests for the washer 70, which is made from a magnetic material, to directly abut closed axial end 42 of inner case 40. It has also been found, however, that even greater shielding can be obtained by including a non-magnetic spacer between washer 70 and closed end 42. Such a spacer transmits the preload force but separates the inner and outer shields at that end of the sensor to a greater degree. This invention contemplates either construction.

The preceding describes a preferred embodiment of this invention; but equivalents will occur to those skilled in the art. Therefore, this invention should be limited only by the claims which follow.

The embodiments of the invention in which an exclusive property or privilege is claimed are defined as follows:

1. A detonation sensor for a vehicle mounted engine comprising, in combination:
   an elongated magnetostrictive element;
   means associated with the magnetostrictive element effective to establish a magnetic flux therethrough;
   a pickup coil disposed around the magnetostrictive element and responsive to changes in the magnetic flux through the magnetostrictive element to convert said changes into electrical output signals;
   a generally cylindrical outer case comprising a magnetic material and having a closed axial end with means for attachment to the engine for vibration therewith and an open axial end, the magnetostrictive element being disposed coaxially within the case, the outer case forming a first shield for the magnetostrictive element from external magnetic fields;
   a generally cylindrical inner case comprising a magnetic material and being disposed coaxially within the outer case and around the magnetostrictive element to form a second shield for the magnetostrictive element from external magnetic fields, the inner case having a closed end adjacent the end of the magnetostrictive element opposite the closed end of the outer case and an open end adjacent the closed end of the outer case;
   means on the open axial end of the outer case operatively engaging the closed end of the inner case and biasing the inner and outer cases toward each other, the closed ends of the inner and outer cases operatively engaging and compressing the magnetostrictive element in compressive preload, whereby vibrations of the engine cause corresponding variations in said magnetic flux and thus in said electrical output signals.

2. A detonation sensor for a vehicle mounted engine comprising, in combination:
   a generally cylindrical outer case of a magnetic material having a closed axial end, an open axial end and means adjacent the closed axial end for attachment to the engine for vibration therewith;
   a generally cylindrical inner case of a magnetic material disposed coaxially within the outer case, the inner case having an open axial end disposed adjacent the closed axial end of the outer case and a closed axial end adjacent the open axial end of the outer case;
   a permanent magnet within the inner case;
   at least one rod of magnetostrictive material within the inner case, the magnetostrictive rod and permanent magnet being disposed axially in line between the closed ends of the inner and outer cases, the magnetostrictive rod and magnet being of sufficient combined axial length to keep the open axial end of the inner case slightly axially separated from the closed axial end of the outer case;
   coil means surrounding the magnetostrictive rod within the inner case;

means on the open axial end of the outer case operatively engaging the closed end of the inner case and biasing the inner case toward the closed axial end of the outer case, whereby the magnetostrictive rod is stressed, the stress and therefore the reluctance of the rod being variable by axial vibrations of the sensor, whereby signal voltages indicative of said vibrations are induced in the coil, the inner and outer cases forming a double shield for the coil against stray, external electromagnetic interference.

* * * * *